(12) United States Patent
Behnke

(10) Patent No.: US 7,877,969 B2
(45) Date of Patent: Feb. 1, 2011

(54) METHOD FOR ADJUSTING A WORKING UNIT OF A HARVESTING MACHINE

(75) Inventor: Willi Behnke, Steinhagen (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 394 days.

(21) Appl. No.: 11/513,980

(22) Filed: Aug. 31, 2006

(65) Prior Publication Data

US 2007/0056258 A1  Mar. 15, 2007

(30) Foreign Application Priority Data

Sep. 14, 2005  (DE) .................... 10 2005 043 991

(51) Int. Cl.
*A01D 41/127* (2006.01)
(52) U.S. Cl. ..................... 56/10.2 R; 701/50
(58) Field of Classification Search ............. 56/10.2 R, 56/10.2 A, 10.2 J; 460/1; 701/50
See application file for complete search history.

(56) References Cited

U.S. PATENT DOCUMENTS

| 6,009,186 | A | * | 12/1999 | Gorretta et al. | ............. 382/110 |
| 6,097,425 | A | * | 8/2000 | Behnke et al. | ................ 348/89 |
| 6,119,442 | A | | 9/2000 | Hale | |
| 2006/0191251 | A1 | * | 8/2006 | Pirro et al. | ..................... 56/60 |

* cited by examiner

*Primary Examiner*—Alicia M Torres
(74) *Attorney, Agent, or Firm*—Michael J. Striker

(57) ABSTRACT

A method of adjusting at least one working unit of a harvesting machine includes taking pictures or picture series of a crop-material flow at a position downstream from a particular working unit in a crop-material conveyance path at various setting states with certain control parameter setting values of the working unit, storing the pictures or picture series such that they are assigned to control parameter setting values belonging to a particular setting state, with which a picture or a picture series is selected based on an analysis of the crop-material flow depicted in the picture or picture series, and adjusting the particular working unit using the control parameter setting values assigned to the selected picture or the selected picture series; and a harvesting machine carries out the method.

17 Claims, 7 Drawing Sheets

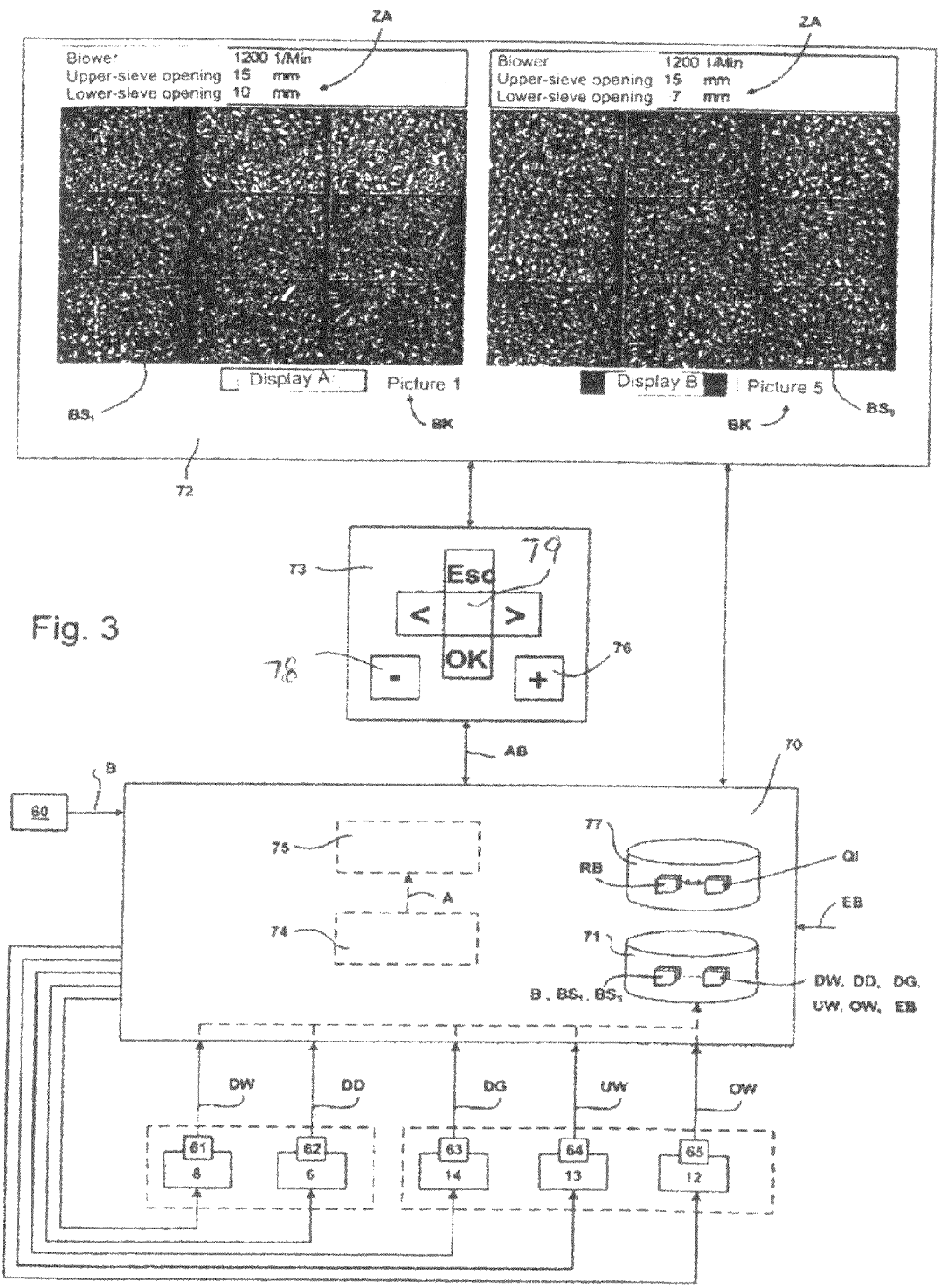

METHOD FOR ADJUSTING A WORKING UNIT OF A HARVESTING MACHINE

CROSS-REFERENCE TO A RELATED APPLICATION

The invention described and claimed hereinbelow is also described in German Patent Application DE 10 2005 043 991.8 filed on Sep. 14, 2005. This German Patent Application, whose subject matter is incorporated here by reference, provides the basis for a claim of priority of invention under 35 U.S.C. 119(a)-(d).

BACKGROUND OF THE INVENTION

The present invention relates to a method for adjusting a working unit of a harvesting machine, in particular a self-propelled harvesting machine. The present invention also relates to a harvesting machine, with which at least one of the working units is adjustable according to a method of this type.

Agricultural harvesting machines, in particular self-propelled harvesting machines such as combine harvesters, forage harvesters, etc., include several adjustable working units for processing various types of crops. With modern harvesting machines, the individual units are typically equipped with adjusting devices—which are remotely controllable from the driver's cab—with which the working units or various control parameters of the working units can be set. Typical working units of a combine harvester are, e.g., the threshing mechanism, which usually includes a concave and one or more cylinders, and a cleaning unit located downstream of the threshing mechanism, the cleaning unit typically including a blower and several sieves. Different types of crops and harvesting conditions, such as moisture, crop height, ground conditions, etc., require that the individual units and/or their adjustable control parameters be adjusted as exactly as possible to the specific, on-going harvesting process, in order to obtain an optimum overall operating result.

Despite the many aids offered by the manufacturers of harvesting machines to help operators perform adjustments—such as comprehensive operator training, printed lists of setting values predetermined for various harvesting situations that the operator can refer to, and electronic tools such as electronic fieldwork information systems preprogrammed with optimized combinations of setting values for highly diverse harvesting situations for the operator to choose from—it is still relatively difficult for operators to adjust the machine such that it functions in an optimum manner according to the desired requirements. This is the case, in particular, for inexperienced and/or untrained operators, particularly at the beginning of a harvesting season. In many cases, therefore, the harvesting machine and/or its working units are not adapted to the current harvesting process in an optimum manner. As a result, the available harvesting capacity of the machine is under-utilized, poor operating results are obtained, or, in some cases, unnecessary crop losses result.

Publication U.S. Pat. No. 6,119,442 therefore describes a method for automatically adjusting the working units of a harvesting machine. Among other things, a machine-observing unit with an image sensor is used that takes pictures of the crop material. These pictures are subsequently evaluated, e.g., to detect damaged-grain portions, contaminants, etc. in the threshed-out and cleaned crop-material flow, and to generate corresponding control signals to suitably adjust the working units. The entire image evaluation and control method is relatively complex, however.

SUMMARY OF THE INVENTION

The object of the present invention, therefore, is to create an alternative control method for adjusting a working unit of a harvesting machine and a corresponding harvesting machine that makes it easy for even relatively untrained operators to adjust the working units of the harvesting machine according to the particular harvesting process in a reliable, optimum manner, even when the adjustment-related dependencies are very complex.

In keeping with these objects and with others which will become apparent hereinafter, one feature of the present invention resides, briefly stated, in a method of adjusting at least one working unit of a harvesting machine, comprising the steps of taking pictures or picture series of a crop-material flow at a position downstream from a particular working unit in a crop-material conveyance path at various setting states with certain control parameter setting values of the working unit; storing the pictures or picture series such that they are assigned to control parameter setting values belonging to a particular setting state, with which a picture or a picture series is selected based on an analysis of the crop-material flow depicted in the picture or picture series; and adjusting the particular working unit using the control parameter setting values assigned to the selected picture or the selected picture series.

Another feature of the present invention resides, briefly stated, in a harvesting machine, comprising a working unit, a picture detector located at a position downstream from the working unit in a crop-material conveyance path to take pictures or picture series of a crop-material flow; a control unit configured such that said working unit is brought into various setting states via a control with certain control parameter setting values, and pictures or picture series of the crop-material flow are taken at various setting states of said working unit; a memory device for storing the pictures or picture series such that they are assigned to control parameter setting values belonging to a particular setting state; a selection unit for selecting a picture or a picture series based on an analysis of the crop-material flow depicted in the picture or picture series; and a control unit configured such that the particular working unit is adjusted using the control parameter setting values assigned to the selected picture or the selected picture series.

With the method according to the present invention for adjusting a working unit of a harvesting machine, initially, pictures or picture series of the crop material are taken at a position downstream from the particular working unit in the crop-material conveyance path at various setting states with certain control parameter setting values of the working unit. These pictures or picture series are stored such that they are assigned to control parameter setting values belonging to the particular setting state of the particular working unit. Subsequently, based on a preferably qualitative analysis of the crop-material flow depicted in the pictures or picture series, a picture or a picture series is selected, and the particular working unit is then adjusted using the control parameter setting values assigned to the selected picture or picture series, i.e., it is controlled with an appropriate setpoint setting value.

With this method, it is therefore not necessary to decide—based on a complicated evaluation of current pictures—which control parameters to adjust in which direction, e.g., whether to select a higher or lower cylinder speed, or whether the mesh width of a lower or upper sieve of the cleaning device should be increased or reduced. Instead, it is only necessary to decide in which of the pictures the crop-material flow is of the best quality. The control parameter setting values that are already known and that are stored together with the picture or the picture series are implemented accordingly. As a result, the entire method is extremely simple and uncomplicated.

To this end, a suitable harvesting machine need be equipped only with an image detector, e.g,. a CCD camera or the like, which is located at a position in the crop-material conveyance path downstream from the particular working unit, in order to take pictures or picture series of the crop-material flow at this position. The image detector can be located downstream of the working unit directly in the crop-material conveyance path, or it can be located at a position in the crop-material flow after further units. For example, to adjust the threshing unit in a combine harvester, a picture of the crop-material flow can be taken ahead of the cleaning device, immediately after the threshing unit. It is also possible, however, to adjust the threshing unit based on pictures or picture series of the crop-material flow that were taken of the threshed-out and cleaned crop-material flow downstream from the cleaning device. The pictures or picture series in the crop-material conveyance path are preferably taken between an outlet of a cleaning device and a crop-material storage device, e.g., a grain tank, or at a crop-material outlet, e,g, a tank unloading conveyor of the harvesting machine.

A corresponding control unit is also required, which acts on the working unit and the image detector and is designed such that the working unit is brought into various setting states via control with certain control parameter setting values, and that pictures or picture series of the crop-material flow are taken at various setting states of the working unit. Also required are a memory device for storing the pictures or picture series together with the assignment of control parameter setting values belonging to the particular setting state, and a selection unit, so that a picture or a picture series can be selected based on an analysis of the crop-material flow depicted in the pictures or picture series. Finally, the harvesting machine must be equipped with a suitable control unit, which is designed such that the particular working unit is adjusted using the control parameter setting values assigned to the selected picture or the selected picture series. This control unit can be the same control unit that is also used to bring the working unit into the various setting states to take the pictures or picture series. The control units can also be composed of several submodules, the two control units accessing the same modules to control the working units. The two control units or the combined control unit can be realized, e.g., in the form of software modules in a programmable control device of the harvesting machine.

The analysis of the crop-material flow depicted in the pictures or picture series, which can be a preferably qualitative, or quantitative evaluation of the crop-material flow, and the selection of the picture or the picture series can be carried out either visually by an operator, semi-automatically or fully automatically.

In a technically very simple method it is possible, e.g., for the pictures or picture series to be displayed to an operator of the harvesting machine for selection. In this case, the selection unit must include a suitable display device to display the pictures or picture series taken at various setting states, and a recording device for recording a selection command made by the operator. Modern harvesting machines typically include appropriate user interfaces anyway with a suitable display and operating elements, which can be used within the framework of the present invention. At least some of the pictures or picture series are preferably displayed to the operator in parallel, so that he can identify the better setting state by directly comparing the pictures or picture series and select the corresponding picture or picture series. In this case, the analysis is therefore carried out by the operator of the harvesting machine simply by his comparing pictures.

It is also possible to automatically analyze the pictures or picture series taken at various setting states and to subsequently select the picture or picture series based on the analysis result. To this end, the harvesting machine must include a related analytical unit, which can be realized, e.g., in the form of software loaded in a suitable programmable control device. An automatic analysis of this type can be carried out with the aid of typical image-evaluation methods, e.g., with an object detection method. To this end, certain picture features can be stored in a memory, it being possible to use the picture features in an image evaluation as characteristic features for detecting certain particles, e.g., straw parts or husks, in the picture of the crop-material flow. In this manner, it is therefore possible, e.g., to easily count the number of "foreign objects" in the crop-material flow that are visible in the picture and, based thereon, to determine a quality level, e.g., a contamination level, of the damaged-grain portion, or to make an unspecific quality assessment such as "good", "poor" or "acceptable", etc. of the crop-material flow depicted.

This analysis result can then be displayed by the operator along with the picture or picture series to help the operator make his selection, preferably a visual/manual selection of a picture or a picture series.

In another preferred variation, the selection is also carried out automatically, e.g., by the machine making a simple comparison of the analysis results of the various pictures. To this end, the harvesting machine preferably includes a suitable mechanical selection unit, which can be implemented, e.g., in a control processor of the harvesting machine.

Particularly preferably, a certain picture or picture series is selected using the selection unit, and the pictures or picture series are also displayed to the operator. The picture or picture series selected by the evaluation unit are marked, and the operator can then confirm the selection or select another picture or another picture series, and the associated setting state.

To support the analysis or selection of a picture or a picture series, reference pictures that have already been stored and that show crop-material flows with a different level of contamination can also be preferably used. Using these reference pictures, it is much easier for the operator, in particular, to decide whether the quality of the crop-material flow is good or bad. Quality information related to the crop-material flow depicted in the particular reference picture is preferably associated with the reference pictures. The quality information can also be displayed, e.g., when the reference pictures are reproduced. Quality information of this type can be an exact measure of quality, e.g., a contamination level, or an unspecific quality assessment, such as "good", "poor", or "acceptable".

To adjust a certain working unit, e.g., the threshing unit or the cleaning device of a combine harvester, at least one control parameter or a group of control parameters of the particular working unit can be intentionally varied—preferably as part of an optimizing procedure—while the remaining control parameters are held constant, and a picture or a picture series is taken at certain settings of this control parameter or the group of control parameters. According to the present invention, a picture or a picture series of the various setting states is then selected and the particular working unit is controlled accordingly with this control parameter setting value or this group of control parameter setting values. In a subsequent cycle, another control parameter or another group of control parameters can then be adjusted in the same manner.

With this method it is also possible to optimize several different working units of the harvesting machine according to the present invention. The working units located further to the front in the crop-material conveyance path in the harvesting machine are preferably adjusted before the downstream working units. This means the threshing unit is optimized first, followed by the cleaning device, since the optimum parameters of the cleaning unit also depend on the crop-material flow coming from the threshing unit. An iterative method is also possible, however, i.e., several optimization cycles are run through, in order to ultimately reach an ideal setting. It is clear that additional parameters important to the harvesting process, such as throughput quantity or a minimum or maximum ground speed to be maintained, can also be taken into account in the optimization of the settings of the working units.

A crop material-dependent basic setting that is predefined in most harvesting machines as the standard can be selected, e.g., as the starting value for the prescribed optimization method. Preferably, a picture of the crop-material flow at a certain setting state is not taken until after a certain time period has ended, after the particular setting state of the working unit was implemented. This means, there is a waiting period until a "start-up" procedure has been carried out, until the quality of the crop-material flow at the location where the picture is taken is actually due to the adjusted setpoint setting state.

With a particularly preferred variation, it is not only the control parameter setting values of the working unit to be adjusted that are stored with the picture or picture series, but also the control parameter setting values for other working units of the harvesting machine that existed at the point in time when the pictures were taken, and/or additional information about the harvesting conditions that existed at the point in time when the pictures were taken. The advantage of this is that the operator, e.g., at a later point in time, can display pictures or picture series of previous optimization processes together with the control parameter setting values and information stored there, and—provided the settings of the other working units and the current harvesting conditions are known—using this information, he can select a suitable previous picture or picture series, to start with a relatively good adjustment immediately. Based on these setting values, a further optimization can be subsequently carried out according to the inventive method.

The novel features which are not considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 shows a schematic depiction of the components in a combine harvester required for the inventive control, and their interaction with each other.

DESCRIPTION OF THE PREFERRED EMBODIMENTS

Figure 1:
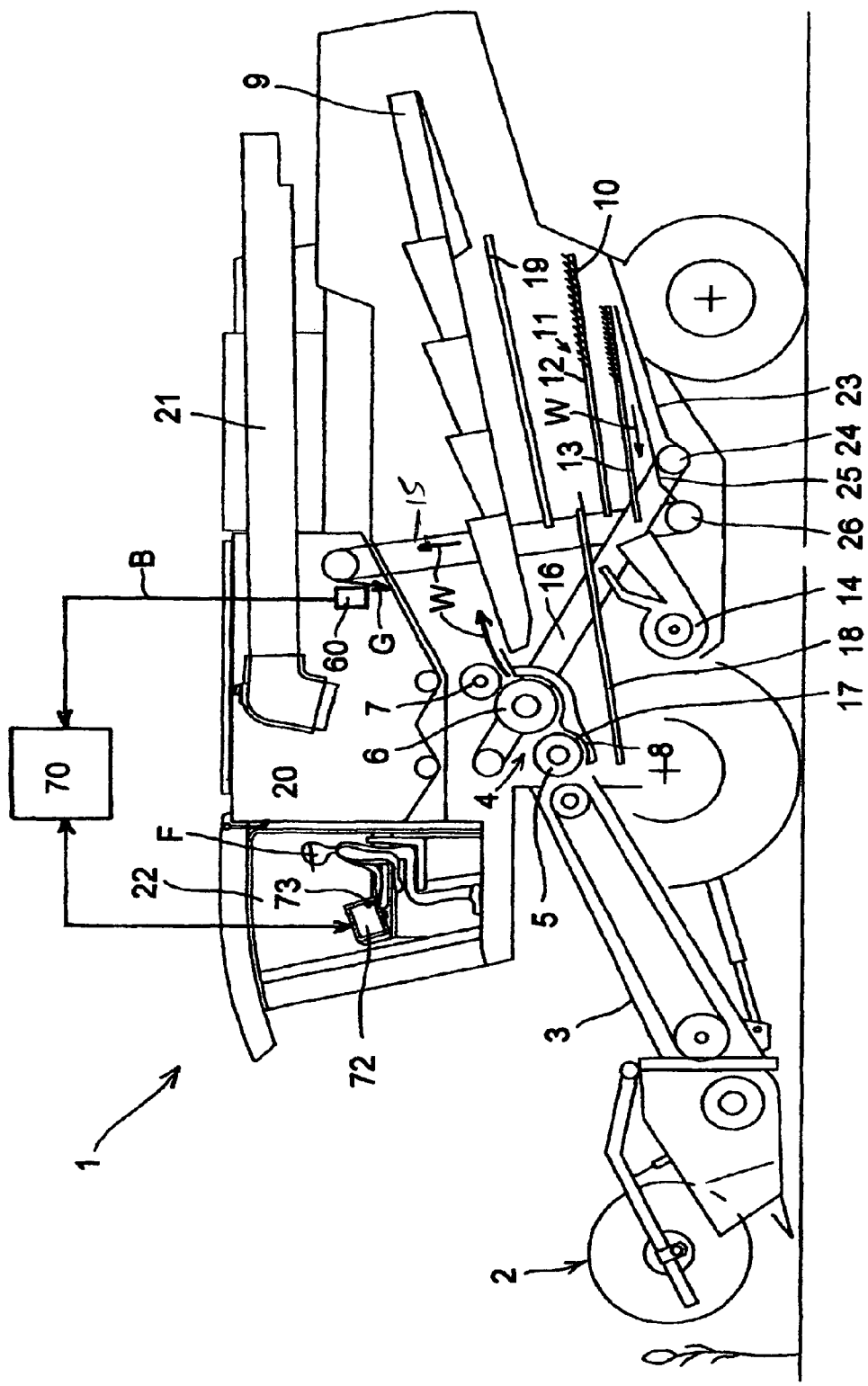
FIG. 1 shows a schematic cross section through a combine harvester.

The exemplary embodiment of the present invention shown in FIG. 1 is a self-propelled combine harvester 1 with a tangential or cross-flow threshing mechanism 4 and a straw walker 9 located behind it, as the separating unit. A cleaning unit 11 is located beneath straw walker 9, cleaning unit 11 being composed of two sieves 12, 13 located one on top of the other, and a blower 14. The present invention is expressly not limited to combine harvesters of this type, however.

The crop material is initially taken up by a header 2, which conveys the crop material to a feed rake 3. Feed rake 3 transfers the crop material to counterclockwise-rotating threshing parts 5, 6, 7 of threshing unit 4. The crop material coming out of feed rake 3 is initially captured by a preacceleration cylinder 5 and is pulled further by a cylinder 6 through threshing gap 17 that is the gap between preacceleration cylinder 5 or cylinder 6 and concave 8 located beneath it. Cylinder 6 processes the crop material mechanically, whereby a grain-chaff mixture is separated out at concave 8 and is conveyed via a grain pan 18 to cleaning device 11. In cleaning device 11, the grains are separated from the admixtures, i.e., from stalk and chaff parts. From threshing mechanism 4, the residual material flow—which is composed mainly of threshed stalks—is conveyed via impeller 7 to tray-type shaker 9, which conveys the residual material flow into the rear region of combine harvester 1. Any grain or any short straw and chaff remaining in the residual material flow are separated out in that they fall through tray-type shaker 9—which includes a sieve opening—to a return pan 19. Return pan 19 transports the grains, the short straw, and the chaff to grain pan 18.

The grain, short straw and chaff also reach cleaning unit 11 via grain pan 18, where the grain is separated from the short straw and chaff. Cleaning is carried out such that wind is blown through the sieve openings in upper sieve 12 and lower sieve 13 using blower 14, the wind loosening the crop material directed via sieves 12, 13 into the rear region of combine harvester 1 and ensuring that the specifically lighterweight chaff and short-straw portions are separated out, while the heavier crop grains fall through the sieve openings. Sieves 12, 13 are located such that they partially overlap, so that the crop material is sifted with two different levels of fineness at two levels, it being possible to adjust the mesh width of sieves 12, 13. Changing the mesh width and/or the speed of blower 14 regulates the portion of the quantity that falls through the sieve openings, the "sieve pass-through", and the portion that is transported via sieve 12, 13, the "sieve overflow".

Sieve pass-through, which falls through upper sieve 12 in tailings region 10, i.e., in the rear region of upper sieve 12 not located over lower sieve 13, and the sieve overflow at the end of lower sieve 13 usually contain heavier particles, i.e., non-threshed-out ears, for example. This portion of crop material is referred to below as the "tailings portion of the crop material". The tailings portion of the crop material falls onto a diagonally extending capture pan 23 beneath cleaning device 11 and slides into a crop-delivery auger 24. Crop-delivery auger 24 conveys the tailings portion of the crop material into a crop elevator 16, which returns it back to threshing mechanism 4. The sieve overflow that does not fall through upper sieve 12 is ejected in the upper region of combine harvester 1 as loss due to cleaning.

The straw and a certain percentage of waste grain travel via tray-type shaker 9 to the rear end of combine harvester 1, from where they are ejected as loss due to separation.

The grain that passes through both sieves 12, 13 of cleaning unit 11 falls onto a further diagonally extending capture and guide floor 25 and slides into a grain-delivery auger 26, which delivers the grain to a grain elevator 15. The grain is then conveyed by grain elevator 15 into a grain tank 20 of combine harvester 1, from where it can be transferred to a trailer as necessary using a tank unloading conveyor 21. According to the present invention, the combine harvester includes an image detector at a position along crop-material conveyance path W—located at the outlet of grain elevator 15 in this case—with which pictures B of crop-material flow G flowing out of grain elevator 15 are taken. In this case, a simple CCD camera 60 serves as the image detector. Using these pictures B, the quality of crop-material flow G is examined, in particular with regard to whether there are any contaminants in the crop-material flow, e.g., straw residue, husks, non-threshed-out ears, etc.

Figure 2A:
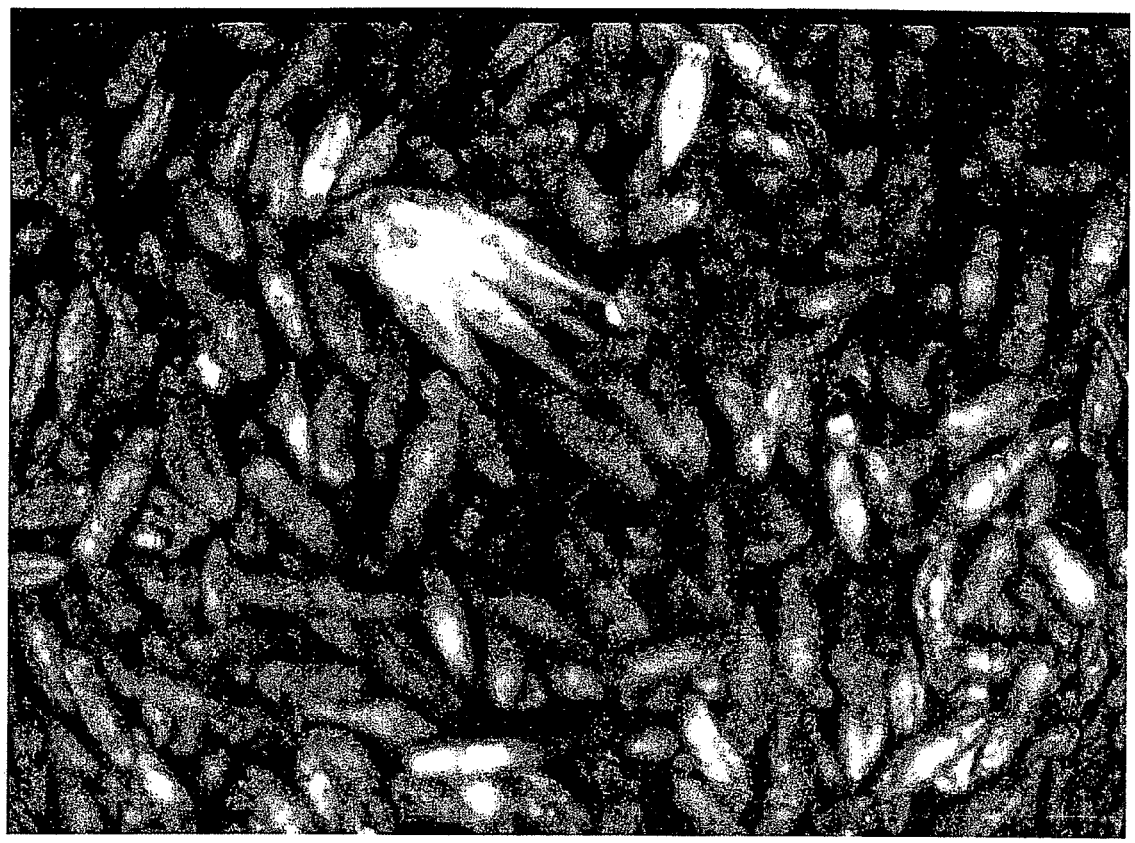
FIGS. 2a through 2d are pictures of various crop-material flows.
Figure 2B:
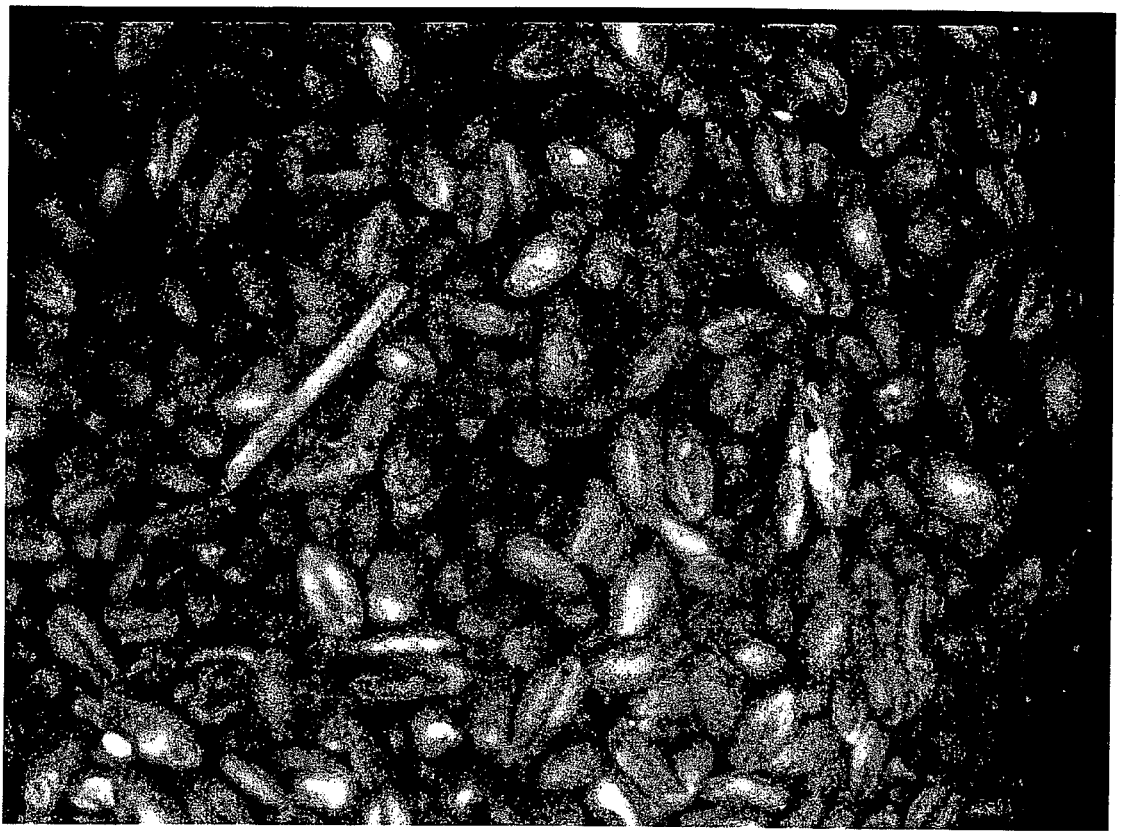
Figure 2C:
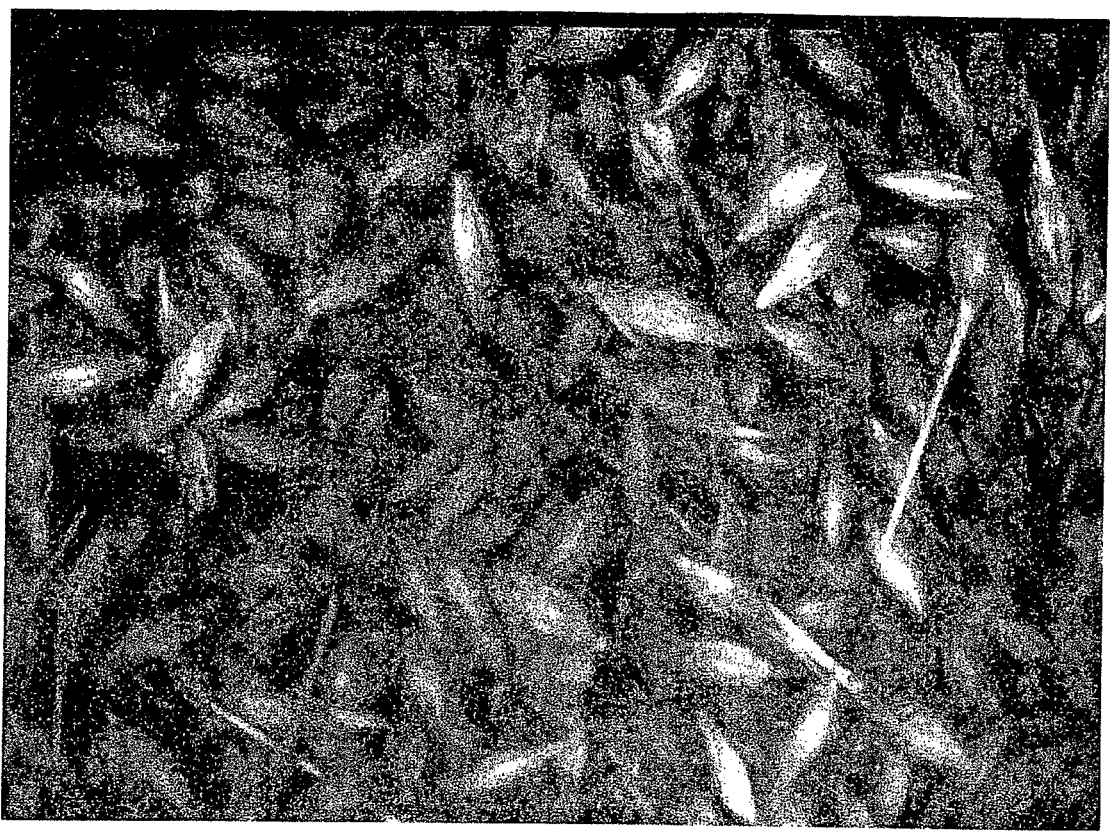
Figure 2D:
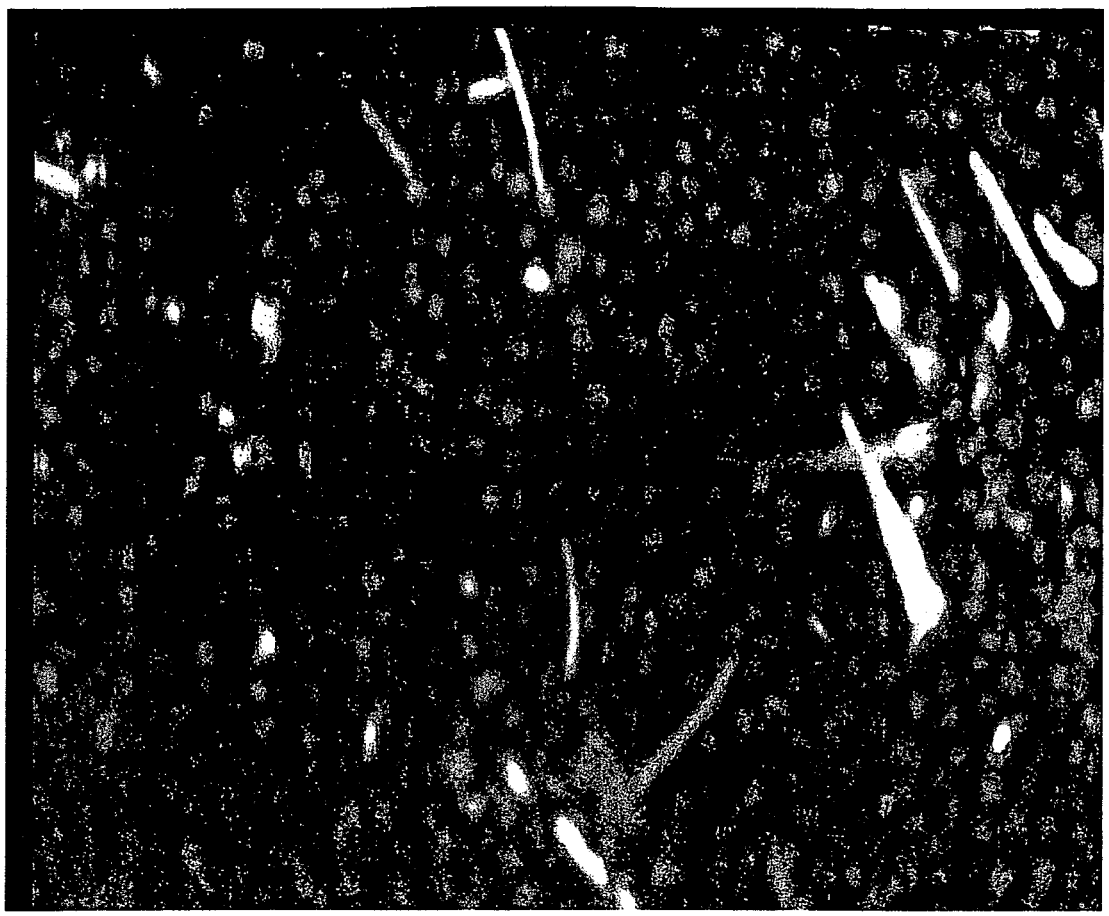

FIGS. 2a through 2d are pictures of various crop-material flows. For simplicity, pictures were selected here in which certain admixtures are still present. FIG. 2a shows a picture of triticale grains; an ear tip is easily visible among the triticale grains in the crop-material flow. FIG. 2b also shows a picture of a triticale crop-material flow; a piece of short straw is easily visible among the triticale grains. FIG. 2c shows a picture of a flow of barley with awns. FIG. 2d shows a flow of rape, in which husk parts are still present.

Pictures B of crop-material flow G taken by camera 60 are forwarded to a control device 70, which is connected with a user interface composed of a display 72 and an operating device 73 in driver's cab 22 of combine harvester 1. There, pictures B can be presented, e.g., to an operator or driver F of harvesting machine 1.

Via user interface 72, 73 located inside driver's cab 22, driver F can also enter, e.g., the current harvesting conditions and the crop material to be harvested, and the crop-material throughput rate that is optimal for this condition and the particular crop material. Driver F can also adjust the related optimum machine parameters or set suggested optimum parameters for the machine.

Control device 70, which is also typically located in driver's cab 22, is depicted only schematically (as a block outside of harvesting machine 1) in FIG. 1. A somewhat more detained depiction is shown in FIG. 3, to which reference is made for the explanations of the present invention below.

As shown in FIG. 3, several sensors are located on the highly diverse working units of combine harvester 1 that measure the setting of the individual parameters of particular working units 4, 11. Only the sensors for threshing device 4 and cleaning device 11 are shown in the example in FIG. 3. For example, a concave-width measuring device 61 is located on concave 8, which detects threshing gap 17 between concave 8 and preacceleration cylinder 5 and/or threshing gap 17 between concave 8 and cylinder 6, and sends a corresponding concave-width signal DW, as a control parameter setting value, to control device 70. A cylinder speed measuring device 62 is assigned to cylinder 6 that delivers cylinder speed DD to control device 70.

Speed DG of blower 14 is detected by a blower speed measuring device 63 and is also transmitted to control device 70. Mesh widths UW, OW of lower sieve 13 and upper sieve 12, respectively, are determined by a lower sieve-width measuring device 64 and an upper sieve-width measuring device 65, and are transmitted to control device 70. Control device 70 can control—in loops that are depicted here schematically—concave 8 or a control element located thereon, cylinder drive, blower drive and the adjusting device for lower sieve 13 and upper sieve 12 for setting the desired control parameter setting values DW, DD, DG, UW, OW.

Operating device 73 and display device 72 are also controlled using control device 70. Display device 72 can also be controlled directly using operating device 72, however.

As depicted in FIG. 3, control device 70 also receives pictures B from camera 60. Components of control device 70 include, e.g., an image-analyzing unit 74 and a selection unit 75, and two memory units 71, 77 for storing current pictures B or picture series $BS_1$, $BS_5$, of reference pictures RB, quality information $Q_1$ and/or measured control parameter setting values DW, DD, DG, UW, OW. In addition, harvesting conditions EB can be entered, e.g., via user interface 72, 73 or by further measuring devices that can also be stored in one of the memory device 76.

Control device 70 is depicted schematically in FIG. 3 as a block, in which highly diverse components are integrated. Control device 70 can be built out of hardware and/or software components in the typical manner. A control device 70 of this type typically includes a processor or several interconnected processors on which appropriate software is implemented for controlling the individual components and evaluating the measured signals. Selection unit 75 and analysis unit 74 can be designed in the form of software, for example. Via suitable further, not-shown interfaces, control device 70 can also receive any other measured signals, e.g., from sensors for measuring the quantity of crop material, the quantity of tailings in the crop material, the losses, etc., and it can output control commands to any of the other working units, e.g., to tray-type shaker 9, tank unloading conveyor 21, header 2, etc.

Memory units 71, 77 are depicted here as components of control device 70. The memories can also be external, however, to which control device 70 has access, in order to store data there and call it up again. It is also possible to store all data in only one memory device. Furthermore, memory devices that are already being used for other components of combine harvester 1 can be shared.

The same applies for control device 70 itself. Control devices that are already present in the machine can also be used for the inventive method, i.e., the existing control devices can be equipped or retrofitted by implementing the modules required per the present invention. In particular, the components required for the present invention can also be located on an electronic hardware and software platform (e.g., the CEBIS electronic fieldwork information system from Claas) already present in the harvesting machine. When this is the case, the only step left is to install a suitable image detector at the crop-material flow.

Figure 4:
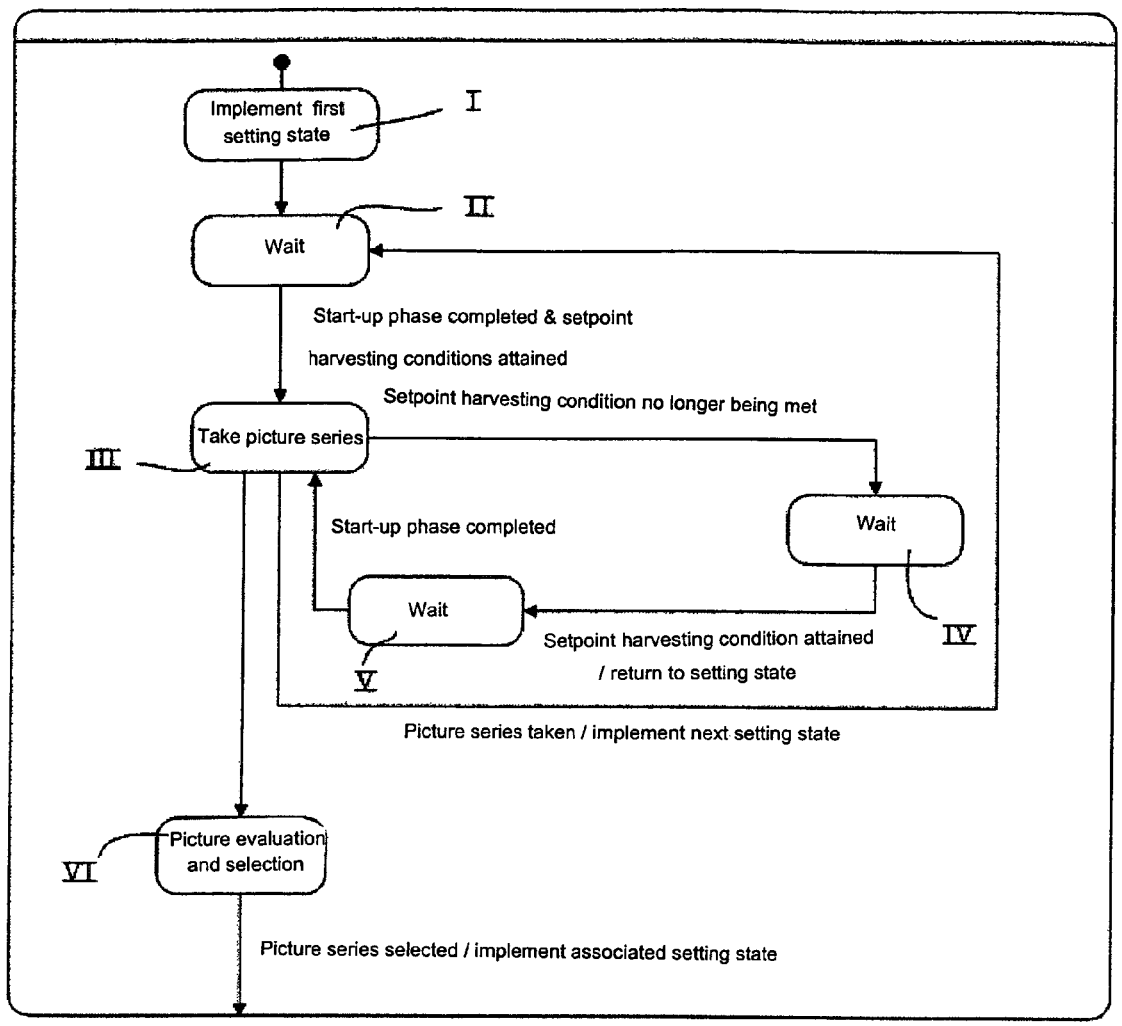
FIG. 4 is a flow chart of the possible sequence of steps followed to take picture series of a crop-material flow.

The procedure for adjusting cleaning device 11 of a combine harvester according to FIG. 1 using the inventive method is described below with reference to FIGS. 3 and 4. The same method can also be used, of course, to adjust threshing device 4 or other working units, such as the tray-type shaker or feed devices. This method can also be used to control the chopper drum or other working units, e.g., in a forage harvester.

As the method starts, in Step I (see FIG. 4), a certain setting state is implemented, e.g., a setting state specified within an electronic fieldwork information system for the particular crop. In Step II, there is a waiting period until a "start-up" procedure has been carried out. This is necessary, since, when a control parameter setting value is adjusted, this change in the setting is not reflected in the crop-material flow until after a certain amount of time has passed. Once the start-up phase has been completed and the current setpoint harvesting conditions have been achieved, pictures of the crop-material flow are taken, in Step III.

With the exemplary embodiment shown, an entire series of nine pictures is taken, instead of one single picture. These picture series $BS_1$, $BS_5$ are (as depicted in FIG. 3) displayed to the driver in display device 72 in entirety, with individual pictures located next to and above each other in a matrix pattern. The display of entire picture series $BS_1$, $BS_5$ has the advantage that the pictures better portray the actual state of the crop material, since it is not just an instantaneous snapshot.

The picture series $BS_1$, $BS_5$ taken is then stored together with the current control parameter setting values. When a picture series has been taken, the next setting state is implemented, and a wait ensues again in Step II until the start-up phase has reached the new setting state. In Step III, a new picture series is taken and it is stored together with the setting values. They are stored in memory 71. In memory 71, pictures B or picture series $BS_1$, $BS_5$ are stored together with the current control parameter setting values DW, DD, DG, UW, OW, and with current harvesting conditions EB. The current picture or current picture series $BS_1$, $BS_5$ is preferably depicted on display device 72.

To find the optimum setting of the working units, at least one control parameter setting value of a working unit is changed. As an option, however, a group of control parameter setting values can also be changed simultaneously. Varying only one control parameter setting value has the advantage, however, that the driver can immediately recognize what effect this specific control parameter has on the quality of the harvested crop material. The various setting states required to take the pictures, i.e., the determination of the particular control parameter setting values for the various setting states in which picture series can be taken, can be implemented automatically. Via the user interface, however, the driver can also determine the setting states or control parameter setting values at which he wants to take picture series.

Since the quality of the crop-material flow depends not only on the current setting state of the working unit, but is also greatly influenced by the harvesting condition, e.g., the crop height and ground speed, it is important that the harvesting conditions be held as constant as possible while the pictures are being taken. The ground speed, in particular, must be kept constant, to avoid changing the crop-material throughput too extremely, since this is what the load on the particular working unit depends on. Since the harvesting conditions can change significantly while a picture series is being taken, e.g., when a turning maneuver is performed or when driving out of or onto a field, the taking of picture series should be interrupted during a phase of this type.

If the setpoint harvesting conditions cannot be maintained while taking a picture series in Step III, the control initially transitions back into a waiting state (Step IV). In this waiting state, a wait ensues until the setpoint harvesting conditions are attained again, e.g., until the combine harvester is performing the normal harvesting procedure on the field again, after having made a turning maneuver. Finally, the previously-set setting state is implemented again. In Step V, a wait ensues through the start-up period, and the picture series or the remaining pictures in the picture series are taken in Step III. To determine the current harvesting conditions, the combine harvester includes suitable sensors, such as ground-speed measuring devices, layer thickness measuring devices in the crop-material intake, and/or further throughput measuring devices, etc., or signals from sensors that are already present for other purposes are evaluated accordingly for the inventive method.

As soon as the picture series has been taken in all setting states to be implemented, the pictures are evaluated and selected in Step VI. This will be explained in greater detail below with reference to FIG. 3. Once a picture series has been selected, the associated setting state is implemented. The same method can then be carried out for a further control parameter setting value or another working unit, and the control parameter setting value optimized initially is then held constant. This method is preferably carried out such that the anterior working units along the crop-material conveyance path are adjusted first, since the load on the subsequent working units depends on the adjustment of the upstream working units. Dependencies of the various control parameters of a working unit to be adjusted should also be taken into account in the series adjustment. To incorporate mutual dependencies, the method can be carried out in an iterative manner.

To select a picture series $BS_1$, $BS_5$, they are depicted on a display device 72, as shown in FIG. 3. In this case, this display device 72 includes two display fields, "Display A" and "Display B", in which two different picture series $BS_1$, $BS_5$ can be depicted in parallel next to each other. Each picture series $BS_1$, $BS_5$ is composed of nine individual pictures—which were taken of the crop-material flow in close succession—arranged in a matrix pattern. The relevant control parameter setting values at which particular picture series $BS_1$, $BS_5$ was taken are displayed above the particular picture series in a state display field ZA.

As mentioned above, the exemplary embodiment shown in FIG. 3 is the setting of cleaning device 11. Picture series $BS_1$, $BS_5$ differ here by the fact that—as depicted in state display fields ZA above them—the lower-sieve opening (lower-sieve width) is 10 mm in picture series $BS_1$, on the left, while the lower-sieve opening is only 7 mm in picture series $BS_5$ on the right. As shown in picture series $BS_1$ on the left, with a lower-sieve opening setting of 10 mm, the crop-material flow still contains short straw parts, while, with a lower-sieve opening of 7 mm, as shown in picture series $BS_5$ on the right, there are no short straw parts.

Using plus/minus buttons 78, 76 on operating device 73, driver F can scroll to the current display field ("Display A" or "Display B") in the stored picture series, i.e., he can call up a certain picture series $BS_5$ from memory 71, which is then depicted on particular current display field. The "current" display field is indicated by the fact that the label ("Display B" in this case) has a black background. The associated control parameter setting values are displayed, for example, in the status display field at the top. A name or a number ("Picture 1/ [Bid 1]/" and "Picture 5/ [Bid 5]" in this case), for example, is displayed under the pictures in a picture-name display field BK. This makes it easier for driver F to locate the pictures or picture series $BS_1$, $BS_5$ in the memory or to relocate previously displayed pictures/picture series. He can move back and forth between the display fields using cursor key 79. If he wants to implement the settings associated with a certain picture series, i.e., if he wants to select a picture series, he can press the "OK" button of cursor 79. A corresponding selection command AB is then transmitted to control device 70. The inventive control method can be called up in a higher-order control menu. The ESC button is used to move up one level in the menu.

The driver can also display the current picture series in one of the two display fields, for example, and, in the other display, he can display reference pictures RB that are stored in second memory device 76 together with quality information QI related to the crop-material flow depicted in the reference pictures. Quality information QI can be the contamination level, or the like. Quality information QI can also be displayed, e.g., in state display field ZA. Harvesting conditions EB that existed when these reference pictures RB were taken can also be displayed here. Evaluating current pictures/picture series $BS_1$, $BS_5$ is made easier for the driver, because he only has to compare the current pictures with reference pictures RB.

With a particularly convenient variation of the present invention, an analysis unit 74 is used to perform an automatic quality analysis of the pictures or picture series $BS_1$, $BS_5$ that were taken. The pictures are examined with regard for undesired components in the crop material using the typical pattern-recognition methods. An analysis of this type is relatively easy, since the components being searched for usually have certain characteristics that "stand out" in the pictures. For example, as shown in FIG. 2*a*, a tip of an ear is easy to see among the triticale grains. Likewise, short straw and awns are easy to see among the grains, due to their very simple features (see FIGS. 2*b* and 2*c*). To this end, the operator needs only look for parallel edges that are located a certain distance apart. The same applies for the husk parts shown in FIG. 2*d*. Corresponding characteristic features of the components being looked for can be stored in memory device 70. Analysis unit 74 can access them for the image evaluation. It is possible, e.g., to simply count the number of contaminating components in a particular picture and, based on this number, to calculate a contamination level. When a picture series contains several pictures, a mean can be calculated, for example.

Analysis result A can be forwarded to a selection unit 75, which selects, fully automatically, a desired picture based on analysis result A. It is also possible, as an alternative, for analysis result A to be output by analysis unit 74 with picture series $BS_1$, $BS_5$ on the display device, to make it easier for driver F to make a selection. Or, selection unit 75 can propose a selection of a picture series $BS_1$, $BS_5$ by marking a picture series $BS_1$, $BS_5$ accordingly, and driver F can either accept or reject it.

Finally, when a picture series $BS_5$ has been selected by the operator automatically or semi-automatically, control parameter setting values DW, DD, DG, UW, OW belonging to this picture series $BS_1$ are implemented. To this end, control device 70 controls working units 4, 11 via the loops such that the desired state parameter setting values DW, DD, DG, UW, OW are specified as setpoint values. Regardless of whether the selection was made automatically, semi-automatically or by the driver, is it preferable to take not only the quality of the crop-material flow displayed in the pictures into account when making the adjustment, but also further parameters, such as crop-material throughput and/or the losses due to cleaning or separation.

Finally, it is pointed out once more that the combine harvester shown in the figures, and the control and the specific method described in conjunction therewith are merely exemplary embodiments that could be modified in a variety of ways by one skilled in the art, without leaving the framework of the present invention. For safety reasons, the system is designed, e.g., such that the driver can manually override one or all of the machine parameters that were set, at any time during a harvesting operation.

It will be understood that each of the elements described above, or two or more together, may also find a useful application in other types of methods and constructions differing from the types described above.

While the invention has been illustrated and described as embodied in it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitutes essential characteristics of the generic or specific aspects of this invention.

What is claimed as new and desired to be protected by Letters Patent is set forth in the appended claims.

The invention claimed is:

1. A processor-controlled method of automatically adjusting at least one working unit of a harvesting machine, comprising the steps of:
    a control unit processor automatically taking reference pictures or reference picture series of a crop-material flow at a position downstream from a particular working unit in a crop-material conveyance path at various setting states with certain control parameter setting values of the working unit;
    the control unit processor automatically storing the reference pictures or reference picture series while assigning the picture or picture series to control parameter setting values belonging to a particular setting state of the working unit;
    the control unit processor automatically selecting a reference picture or reference picture series based on a qualitative analysis of the crop material flow depicted in the reference picture or reference picture series implemented by the control unit processor; and
    the control unit processor automatically adjusting the working unit using the control parameter setting values assigned to the selected reference picture or the selected reference picture series by the control unit processor.

2. The method as defined in claim 1, further comprising within an optimization procedure implemented by the control unit processor, intentionally varying at least one control parameter or a group of control parameters of the working unit while holding remaining control parameters constant; and producing a picture or a picture series at certain settings of this control parameter or the group of control parameters.

3. The method as defined in claim 1, further comprising the control unit processor automatically assigning the control parameters setting values of other working units of the harvesting machine that existed at a point in time when the pictures were taken, to the pictures or picture series and automatically storing information about harvesting conditions that existed at the point in time when the pictures were taken.

4. The method as defined in claim 1, further comprising the control unit processor: not taking a picture or a picture series of the crop-material flow at a certain adjustment state until a certain period of time has expired, after a particular setting state of the working unit was implemented.

5. The method as defined in claim 1, further comprising the control unit processor: displaying the pictures or picture series taken at various setting states to an operator of the harvesting machine for selection.

6. The method as defined in claim 5, wherein said displaying includes providing the display of the pictures or picture series belonging to the various setting states at least partially and parallel.

7. The method as defined in claim 1, further comprising the control unit processor: automatically analyzing the pictures or picture series taken at various setting states; and, based on an analysis result, selecting a picture or picture series.

8. The method as defined in claim 7, wherein said selecting includes a selection of a picture or picture series automatically based on the analysis result.

9. The method as defined in claim 1, further comprising the control unit processor: using reference pictures to analyze a picture series.

10. The method as defined in claim 9, further comprising the control unit processor automatically assigning quality information related to the crop-material flow depicted in a particular reference picture, to the reference pictures.

11. The method as defined in claim 1, further comprising the control unit processor: taking the picture or picture series in a crop-material conveyance path between an outlet of a cleaning device and a crop-material storage device or a crop-material outlet of the harvesting machine.

12. The method as defined in claim 1, further comprising the control unit processor automatically taking pictures or picture series at a setting state, at various positions in the crop-material conveyance path.

13. A harvesting machine, comprising:
a working unit;
a picture detector located at a position downstream from the working unit in a crop-material conveyance path to take reference pictures or reference picture series of a crop-material flow;
a control unit including a control unit processor programmed to automatically bring said working unit into various setting states via a control with certain control parameter setting values and to control taking reference pictures or reference picture series of the crop-material flow at various setting states of said working unit, the control unit comprising:
a memory device for storing the reference pictures or reference picture series such that they are assigned to control parameter setting values belonging to a particular setting state of the working unit; and
a selection unit for selecting a reference picture or a reference picture series based on a qualitative analysis of crop-material flow depicted in the reference picture or reference picture series;
wherein said control unit processor coordinates transfer of pictures or picture series taken by the picture detector into the memory device, controls selecting by the selecting unit and controls adjustment of the working unit using the control parameter setting values assigned to the selected reference picture or the selected reference picture series in response to selecting by the selection unit.

14. The harvesting machine as defined in claim 13, wherein the control unit further comprises an analysis unit for automatically analyzing the picture or picture series taken at various setting states.

15. The harvesting machine as defined in claim 14, wherein said selection unit is programmed to operate such that a selection of a picture or a picture series takes place automatically based on said analysis.

16. The harvesting machine as defined in claim 13, further comprising a display device connected to and controlled by the selection unit to display the pictures or picture series taken at various setting states to an operator of the harvesting machine for selection, and an acquisition device for capturing a selection command from an operator.

17. The harvesting machine as defined in claim 13, further comprising several image detectors located at various positions of the crop-material conveyance path.

* * * * *